United States Patent Office 3,128,275
Patented Apr. 7, 1964

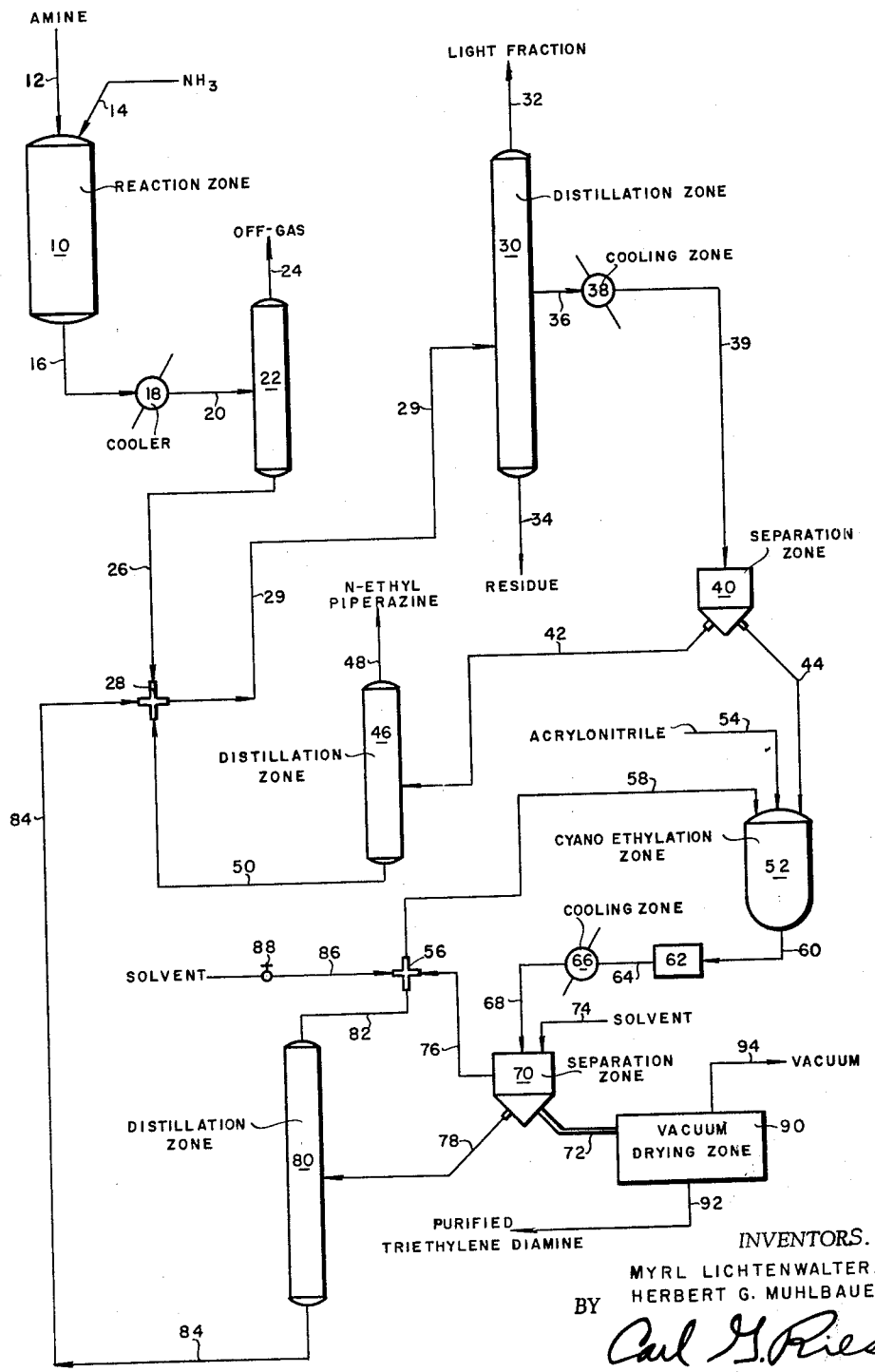

3,128,275
METHOD FOR THE PURIFICATION OF
TRIETHYLENEDIAMINE
Myrl Lichtenwalter and Herbert G. Muhlbauer, Austin, Tex., assignors to Jefferson Chemical Company, Inc., Houston, Tex., a corporation of Delaware
Filed June 7, 1962, Ser. No. 200,849
7 Claims. (Cl. 260—268)

This invention relates to an improved method for the recovery and purification of triethylenediamine. More particularly, this invention relates to an improved method for the recovery and purification of triethylenediamine from the reaction product formed by the cyclization of an ethylenic polyamine.

This application is a continuation-in-part of copending application Serial No. 111,016, filed May 18, 1961, and entitled "Combination Process."

In our co-pending application, there is a disclosure of a method for the preparation of triethylenediamine by the cyclization of an amine such as N-aminoethylpiperazine in the presence of a cyclization catalyst such as solid acidic silica-alumina, or a substantially silica-free tungsten oxide. In our copending application, there is also disclosed that the reaction product formed as a result of the catalytic conversion of the feed stock comprises a wide variety of compounds, including ethylenediamine, monoethanolamine, N-methylpiperazine, N-ethylpiperazine, piperazine, triethylenediamine, unreacted N-aminoethylpiperazine and condensation products thereof (normally considered as a residue).

Because of the physical and chemical characteristics of the by-products that are formed by this reaction, the separation and recovery of triethylenediamine therefrom have presented a serious problem.

In accordance with the present invention a new method has been discovered for the separation and purification of triethylenediamine based upon the discovery that acrylonitrile will selectively and quantitatively react with the piperazine and with the other piperazine-type components that are normally present in the reaction mixture to form cyanoethylpiperazine derivatives which have solubility characteristics significantly different from the solubility characteristics of triethylenediamine. This is in contrast to the similar solubility characteristics of triethylenediamine, piperazine and piperazine-type compounds.

Thus, in accordance with the present invention, a triethylenediamine fraction contaminated with piperazine and N-substituted piperazines is dissolved in a suitable solvent to provide a mixture which is treated with an amount of acrylonitrile which is at least chemically equivalent to the piperazine components of the mixture to thereby quantitatively and selectively form cyanoethylpiperazine compounds. The cyanoethylpiperazine derivatives are significantly more soluble not only with respect to the piperazine compounds from which they are formed but also with respect to triethylenediamine. As a consequence, on chilling of the thus-formed mixture, triethylenediamine of high purity is selectively crystallized and suitably recovered by any means, such as centrifugation, filtration, etc.

The feed stocks that may be employed in preparing triethylenediamine are ethylenic compounds of the types set forth in our co-pending application, in Herrick U.S. Patent No. 2,937,176, etc. Thus, the feed material may be N-aminoethylpiperazine, ethylenediamine, diethylenetriamine, triethylenetetramine, etc., and mixtures thereof.

The cyclization catalyst for converting the ethylenic amine to triethylenediamine may be any catalyst which is suitable for this purpose, such as an acidic silica-alumina catalyst containing from about 60 to 95 wt. percent of silica and, correspondingly, from about 40 to about 52 wt. percent of alumina, a base-treated silica-alumina catalyst of a nature as disclosed, for example, in co-pending Brader application Serial No. 167,960, filed January 22, 1962, a tungsten oxide catalyst as disclosed, for example, in co-pending Brader application Serial No. 110,891, filed May 18, 1961, now U.S. Patent No. 3,056,788, and entitled "Catalytic Synthesis of Triethylenediamine," etc.

The reaction is preferably conducted in the presence of added ammonia (e.g., from about 1 to about 10 mols of ammonia per mol of ethylenic feed stock) and may be conducted in liquid phase or vapor phase, and suitably at a temperature within the range of about 200° to about 500° C. The reaction may be conducted at subatmospheric or superatmospheric pressure.

The product that is formed as a result of this reaction will comprise unreacted ammonia, water, light normally gaseous by-products, ethylenediamine, monoethanolamine, N-methylpiperazine, N-ethylpiperazine, piperazine, triethylenediamine, N-aminoethylpiperazine and higher boiling condensation products thereof.

The reaction product is thereafter fractionated by any suitable means, such as distillation, into a triethylenediamine fraction, such as a fraction boiling within the range of 160° to 190° C. Such a fraction will contain, in addition to triethylenediamine, piperazine and N-alkylpiperazines, such as N-methylpiperazine, N-ethylpiperazine, etc. When this fraction is cooled to a temperature of less than about 160° C., such as room temperature, a precipitate is formed which will be composed principally of triethylenediamine but which will also contain contaminating quantities (normally about 5 wt. percent total) of piperazine and N-alkyl derivatives thereof.

In accordance with the present invention the crude triethylenediamine is dissolved in a solvent consisting of acrylonitrile or a solvent consisting of a mixture of acrylonitrile with other organic compounds, such as aromatic hydrocarbons, aliphatic hydrocarbons, carbonyl compounds, or mixtures thereof, to form a solution. In the latter situation, the amount of acrylonitrile present should be at least chemically equivalent to the amount of piperazine and piperazine-type compounds in the crude triethylenediamine crystals. The thus-prepared solution is maintained for a period of time sufficient to substantially complete the reaction of acrylonitrile with the piperazine and piperazine-type components (e.g., about 0.5 to 5 hours) whereby N-cyanoethylpiperazine compounds are formed. The N-cyanoethylpiperazine compounds will be significantly more soluble in the solvent than the piperazine and piperazine-type compounds. As a consequence, when the organic solution is held to a temperature below the temperature of crystallization of triethylenediamine (e.g., 50° to 100° C.), triethylenediamine will be precipitated. However, in this situation, the triethylenediamine crystals will be substantially completely pure and will contain only trace quantities of contaminants. The pure triethylenediamine precipitate will be recovered by any suitable means, such as filtration, decantation, centrifugation, etc.

Examples of solvents that may be employed alone or in admixture and in conjunction with acrylonitrile include compounds such as acetone, acetonitrile, methyl ethyl ketone, benzene, toluene, hexane, heptane, cyclohexane, etc.

The invention will be further illustrated with respect to the accompanying drawing wherein the single feature is a schematic flow sheet illustrating the preferred embodiment of the present invention.

Turning now to the drawing, a reaction zone 10 is provided which contains a cyclization catalyst such as an acidic silica-alumina cracking catalyst or substantially silica-free tungsten oxide. An amine as above defined (preferably N-aminoethylpiperazine) is charged to reactor 10 by way of a charge line 12. Preferably from about 1 to about 10 mols of ammonia per mol of amine is also charged to reactor 10 by way of a charge line 14. The charge materials are brought into contact with the catalyst in reaction zone 10 under suitable conditions to promote cyclization. For example, the reaction may be conducted at a temperature within the range of about 200° to about 500° C. in vapor phase at substantially atmospheric pressure.

The reaction product is discharged from reaction zone 10 by way of a line 16 leading to a cooler 18 wherein the non-volatile components of the reaction mixture are condensed. From cooler 18, the product is charged by way of a line 20 to a gas separator 22 wherein off-gas is removed overhead by way of a line 24. The off-gas will comprise ammonia, some water and normally gaseous reaction by-products.

The modified components of the reaction mixture are discharged from zone 22 by way of a line 26 leading to a manifold 28; from thence by way of a charge line 29 leading to a distillation zone 30. Zone 30 is shown in the drawing for purposes of convenience as a single distillation column. It will be understood that in practice a plurality of distillation columns may be employed, if desired, in obtaining the desired separation. Within the distillation zone 30, the reaction product is separated into a light fraction 32 comprising components boiling below about 160° C. and comprising water, ethylenediamine, most of the piperazine, some triethylenediamine and some N-methylpiperazine and N-ethylpiperazine.

Heavier components boiling above about 190° C. are discharged as a residue fraction from zone 30 by way of a line 34.

A heart-cut fraction boiling within the range of 160° to about 190° C. which is rich in triethylenediamine (e.g., about 50 to 95 wt. percent triethylenediamine) is discharged by way of a line 36 leading to a cooling zone 38 wherein the fraction 36 is cooled to a temperature below the melting point of triethylenediamine (such as a temperature within the range of about 0° to about 120° C., and preferably about 10° to about 30° C.). As a consequence, a precipitate is formed which is composed principally of triethylenediamine (e.g., about 95 to about 98 wt. percent), but which also contains significant quantities of N-methylpiperazine, piperazine and N-ethylpiperazine. The thus-formed slurry is discharged from a cooling zone 38 by way of line 39 leading to a separation zone 40 wherein the slurry is resolved into a filtrate fraction 42 and a solid filter cake fraction 44. In accordance with the preferred embodiment of the present invention, the filtrate fraction 42 is discharged to a distillation zone 46 such as a flash column or a simple distillation column wherein a light fraction 48 comprising N-ethylpiperazine can be removed overhead for discard from the system. The bottoms fraction 50 from column 46 is preferably recycled to the charge manifold 28 for distillation zone 30.

The solid, but impure, triethylenediamine fraction 44 is charged to cyanoethylation zone 52. Acrylonitrile is also charged to the zone 52 by way of a line 54 and, preferably, another solvent is charged from manifold 56 by way of a line 58 to the zone 52. The relative proportions to be employed for this step should be such that the amount of solvent added is sufficient to completely dissolve the fraction 44 at a temperature above about 50° C. and the amount of acrylonitrile added should be in chemical excess of the amount required for cyanoethylation of the piperazine components.

The mixture in cyanoethylation zone 52 is heated to a temperature above about 50° C., such as a temperature within the range of about 60° to about 90° C. for a period of time within the range of about 0.5 to 5 hours whereby substantially selective and complete cyanoethylation of the piperazine components occurs. At the end of the holding time, the solution, while being maintained at a temperature in excess of about 50° C. or above the temperature required to maintain a homogeneous liquid phase, is discharged by a line 60 leading to a filter 62 for the removal of trash or other extraneous contaminants, and then charged by way of a line 64 to a cooling zone 62 wherein the solution is cooled to a temperature of about 50° C. or less (e.g., 10° to 30° C.) to thereby selectively precipitate a portion of the triethylenediamine from the solution; the precipitated triethylenediamine being characterized by the presence of only minor quantities of contaminated components and crystallizing solvent. The thus-formed solution is passed by way of a line 68 to a second separation zone 70 wherein the slurry is separated into a solid filter cake fraction 72 consisting of solid purified triethylenediamine. Prior to discharge from the separation zone 70, the filter cake is preferably washed with fresh solvent introduced into the separation zone 70 by way of a line 74 in order to remove occluded filtrate. The purified triethylenediamine is preferably charged from line 72 to a vacuum drying zone 90 of any conventional construction where it is warmed at a temperature of not more than about 60° C. at a subatmospheric pressure sufficient to remove vapors of evaporated solvent. The vapors are drawn off through vacuum line 94 and the purified triethylenediamine, substantially completely free from solvent, is thereafter discharged through conduit 90.

The wash solvent may suitably be separately recovered from the filtrate and recycled by way of a line 76 to the charge manifold 56 for cyanoethylation zone 52.

The filtrate fraction from separation zone 70 is discharged by way of a line 78 leading to a distillation zone 80, such as a distillation column wherein it is separated into an overhead solvent fraction 82 which is recycled to manifold 56, and a bottoms fraction 84 which is suitably recycled to the manifold 28.

It will be understood that from time to time fresh solvent may be added as desired by way of a fresh solvent charge line 86 controlled by a valve 88 leading to the charge manifold 56 for cyanoethylation zone 52.

The invention will be still further illustrated by the following specific examples which are given by way of illustration and not as limitations on the scope of this invention.

EXAMPLE I

Forty grams of a crude cut of triethylene diamine was dissolved in 50 ml. of acrylonitrile at around 60° C. and solution was allowed to stand for an hour to be certain piperazine in triethylene diamine had reacted with acrylonitrile. The solution was cooled in ice for an hour and filtered. Eighteen grams of needles (crystals) were obtained which on drying analyzed as containing less than 0.01% piperazine and more than 99% triethylenediamine. The mother liquors from above filtration were cooled in Dry Ice-acetone bath and another 17 grams of crystals were deposited and filtered off. Analysis of these crystals was the same as for the first crop.

EXAMPLE II

Two hundred grams of crude crystalline triethylenediamine was heated with 224 grams acetone and 10 grams of acrylonitrile to 54° C. to dissolve all the triethylenediamine. The solution was filtered hot to remove dirt and cooled to below 30° C. Crystallized solids were centrifuged from the liquor yielding 106 grams of crystals, which were dried under vacuum using no heat. The dried crystals analyzed 0.6% water or lights, less than 0.01% piperazine and 99+% triethylenediamine. No other impurities were detected by vapor phase chromatography. Appearance of crystals was white and free of foreign matter.

EXAMPLE III

In a semi-continuous run, a commercial size charge of triethylenediamine concentration fraction boiling between 160° and 190° C. are prepared by the cyclic deamination of N-aminoethylpiperazine was employed as a feed stock.

The feed stock contained about 60 to 75% of triethylenediamine, the remainder being piperazine, N-methylpiperazine, N-ethylpiperazine and other unidentified reaction by-products. The fraction, on being recovered by distillation, was charged to a crystallizing kettle where it was cooled to a temperature of about 20° C., which resulted in the formation of crude triethylenediamine crystals of from about 95% to about 98% purity. The thus-formed slurry was centrifuged to obtain crude triethylenediamine crystals. The crude triethylenediamine crystals (of 95 to 98% purity) were charged to a cyanoethylation kettle, together with about 50 wt. percent of acetone (based on the charge) and an excess of the amount of acrylonitrile required to form cyanoethylpiperazine from the piperazine components of the crude triethylenediamine crystals (e.g., about 5 wt. percent acrylonitrile based on the crude triethylenediamine).

The thus-formed mixture was heated to a temperature of about 50° C. to dissolve all of the amine components in the solvent and to insure complete cyanoethylation of the piperazine components. The solution was filtered while hot to remove trash and other extraneous impurities and the temperature was then slowly reduced to less than 50° C. (about 20° to 25° C.), whereupon high purity triethylenediamine crystals were crystallized from solution.

The thus-formed slurry was subjected to centrifugation to obtain a filter cake fraction which was washed with fresh acetone.

The washed and centrifuged dried triethylenediamine filter cake fraction was dried under vacuum for about 4 to 6 hours at a temperature of about 30° to about 40° C.

The purity of samples of the thus-prepared triethylenediamine was determined, together with the purity of commercially available triethylenediamine. The results are set forth in Table I.

TABLE I

|  | Sample 1 | Sample 2 | Commercial |
|---|---|---|---|
| M.P., °C | 158 | 157 | 146 |
| Water, wt. percent | 0.16 | 0.42 | 1.6 |
| Acetone, wt. percent | 0.2 | 0.17 | |
| Piperazine, wt. percent | <0.01 | <0.01 | 0.08 |
| Appearance | White | White | Yellow |

EXAMPLE IV

*Recrystallization of Triethylenediamine From Methyl Ethyl Ketone and Acrylonitrile*

Crude triethylenediamine crystals (450 grams), obtained by crystallization and centrifugation techniques from a distilled fraction of reactor effluent boiling in the range 160° to 190° C., were mixed in a beaker with methyl ethyl ketone (410 grams) and acrylonitrile (18 grams). The mixture was heated, with stirring, to about 40° C. to dissolve all of the solids. The solution was filtered hot to remove insoluble foreign matter. Crystallization was affected by cooling slowly, with agitation, to 22° C.; centrifugation of the resulting slurry yielded 174 grams of solid product and 663 grams of filtrate. The 41 gram loss was attributed to hold-up and solvent evaporation during the centrifugation step. The solid product was dried for 15 hours in a vacuum oven at room temperature. Analysis of the crude charge and dried product are as follow:

| Material | Tests | | | |
|---|---|---|---|---|
|  | Percent TEDA | Percent Piperazine | Percent MEK | Percent H₂O |
| Crude triethylenediamine | 84 | 13.62 |  | 0.24 |
| Product triethylenediamine | 99 | 0.03 | 0.08 | 0.18 |

EXAMPLE V

*Recrystallization of Triethylenediamine From Acetonitrile and Acrylonitrile*

Crude triethylenediamine crystals (510 grams), obtained by crystallization and centrifugation techniques from a distilled fraction of reactor effluent boiling in the range 160° to 190° C., were mixed in a beaker with acetonitrile (451 grams) and acrylonitrile (20 grams). The mixture was heated, with stirring, to about 52° C. to dissolve all of the solids. The solution was filtered hot to remove insoluble foreign matter. Crystallization was effected by cooling slowly, with agitation, to 23° C.; centrifugation of the resulting slurry yielded 74 grams of solid product and 871 grams of filtrate. The 36 gram loss was attributed to hold-up and solvent evaporation during the centrifugation step. The solid product was dried in a vacuum oven at room temperature for 15 hours. Analyses of the crude charge and dried product are as follow:

| Material | Tests | | | |
|---|---|---|---|---|
|  | Percent TEDA | Percent Piperazine | Percent Acetonitrile | Percent Water |
| Crude triethylenediamine | 84 | 13.62 |  | 0.24 |
| Product triethylenediamine | 99 | 0.02 | 0.30 | 0.16 |

EXAMPLE VI

*Azeotropic Drying and Recrystallization of Triethylenediamine With Toluene and Acrylonitrile*

Crude triethylenediamine crystals (501 grams) obtained by crystallization and centrifugation techniques from a distilled fraction of reactor effluent boiling in the range 160° to 190° C., were mixed in a suitable boiling flask with toluene (517 grams) and acrylonitrile (21 grams). The mixture was refluxed in a laboratory distillation column until all of the water was drawn off via a special azeotrope head. The flask was removed from the column and the contents cooled slowly, with agitation, to about 22° C.; centrifugation of the resulting slurry yielded 122 grams of solid product and 842 grams of filtrate. The solid product was dried in a vacuum oven at room temperature for 15 hours. Analyses of the crude charge and dried product are as follow:

| Material | Tests | | | |
|---|---|---|---|---|
|  | Percent TEDA | Percent Piperazine | Percent Toluene | Percent Water |
| Crude triethylenediamine | 84 | 13.62 |  | 0.24 |
| Product triethylenediamine | 99 | 0.02 |  | 0.15 |

EXAMPLE VII

*Recrystallization of Triethylenediamine From Benzene and Acrylonitrile*

Crude triethylenediamine crystals (452 grams), obtained by crystallization and centrifugation techniques from a distilled fraction of reactor effluent boiling in the range 160° to 190° C., were mixed in a beaker with benzene (505 grams) and acrylonitrile (128 grams). The mixture was heated until a clear solution was obtained and filtered hot to remove insoluble foreign material. The clear solution was cooled slowly, with agitation, to 25° C.; centrifugation of the resulting slurry yielded 50 grams of solid product and 883 grams of filtrate. The losses were attributed to hold-up and solvent evaporation during the centrifugation step. Analyses of the crude charge and solid product are as follow:

| Material | Tests | |
|---|---|---|
| | Percent TEDA | Percent Piperazine |
| Crude triethylenediamine | 84 | 13.62 |
| Product triethylenediamine | 99 | 0.07 |

Benzene and related aromatic solvents have an added advantage. Thus, the benzene solution can be heated to a temperature sufficient to boil off some of the benzene before cooling of the solution to precipitate the triethylenediamine. When this is done, any water that may have been present will be azeotroped overhead with the benzene vapors to thereby dry the solution.

Having thus described our invention, what is claimed is:

1. A method for the purification of triethylenediamine which comprises the steps of:
    (a) dissolving crude triethylenediamine contaminated with piperazine components in an inert organic solvent solution comprising acrylonitrile, said acrylonitrile being in chemical excess of the piperazine components to thereby substantially, selectively and quantitatively cyanoethylate the piperazine components and form cyanoethylpiperazine compounds,
    (b) cooling said solution to selectively precipitate high purity triethylenediamine,
    (c) and recovering said precipitated high purity triethylenediamine.

2. A method which comprises the steps of contacting N-aminoethylpiperazine with a cyclization catalyst at a temperature within the range of about 200° to about 500° C. to form a reaction product comprising triethylenediamine, piperazine, N-alkylpiperazine, light components, fractionating said reaction product to provide a fraction boiling within the range of about 160° to about 190° C., cooling said fraction boiling within the range of about 160° to about 190° C. to form a slurry of crude triethylenediamine crystals contaminated with piperazine compounds in a mother liquor, recovering said crude triethylenediamine crystals, dissolving said crude triethylenediamine crystals in an inert organic solvent, treating said organic solution of crude triethylenediamine at a temperature above about 50° C. with an amount of acrylonitrile in chemical excess of the piperazine compounds to thereby substantially, selectively and quantitatively cyanoethylate the piperazine components and form cyanoethylpiperazine compounds, cooling said solution to a temperature of less than about 50° C. to selectively precipitate high purity triethylenediamine and recovering said precipitated high purity triethylenediamine.

3. A method as in claim 2 wherein the cyclization catalyst is a substantially silica-free tungsten oxide and the inert organic solvent is a dilower alkyl ketone.

4. A method as in claim 2 wherein the solvent is benzene.

5. A method as in claim 2 wherein the solvent is acetone.

6. A method as in claim 2 wherein the solvent is methyl ethyl ketone.

7. A method which comprises the steps of contacting N-aminoethylpiperazine with a cyclization catalyst at a temperature within the range of about 200° to about 500° C. to form a reaction product comprising triethylenediamine, piperazine compounds including piperazine and N-alkylpiperazines, and light components, fractionating said reaction product to provide a fraction boiling within the range of about 160° to about 190° C., cooling said fraction boiling within the range of about 160° to about 190° C. to form a slurry of crude triethylenediamine crystals contaminated with said piperazine compounds in a mother liquor, recovering said crude triethylenediamine crystals, recovering said crude triethylenediamine crystals still contaminated with said piperazine compounds, treating said thus recovered crude triethylenediamine with an excess of acrylonitrile based on said piperazine compounds to thereby substantially, selectively and quantitatively cyanoethylate said piperazine compounds and thereafter separating pure triethylenediamine from said cyanoethylated compounds.

References Cited in the file of this patent

UNITED STATES PATENTS

| 2,659,754 | Ash et al. | Nov. 17, 1953 |
| 2,734,892 | Carter | Feb. 14, 1956 |
| 2,786,052 | Beek | Mar. 19, 1957 |
| 2,848,466 | Fletcher | Aug. 19, 1958 |
| 2,954,404 | Laufer | Sept. 27, 1960 |

FOREIGN PATENTS

| 641,597 | Germany | Feb. 11, 1937 |

OTHER REFERENCES

Behr et al.: Journal American Chemical Society, vol. 68, pp. 1296–1297 (1946).